March 27, 1945.  F. A. GARRETT  2,372,420
DYNAMOMETER
Filed Feb. 1, 1944   5 Sheets-Sheet 1
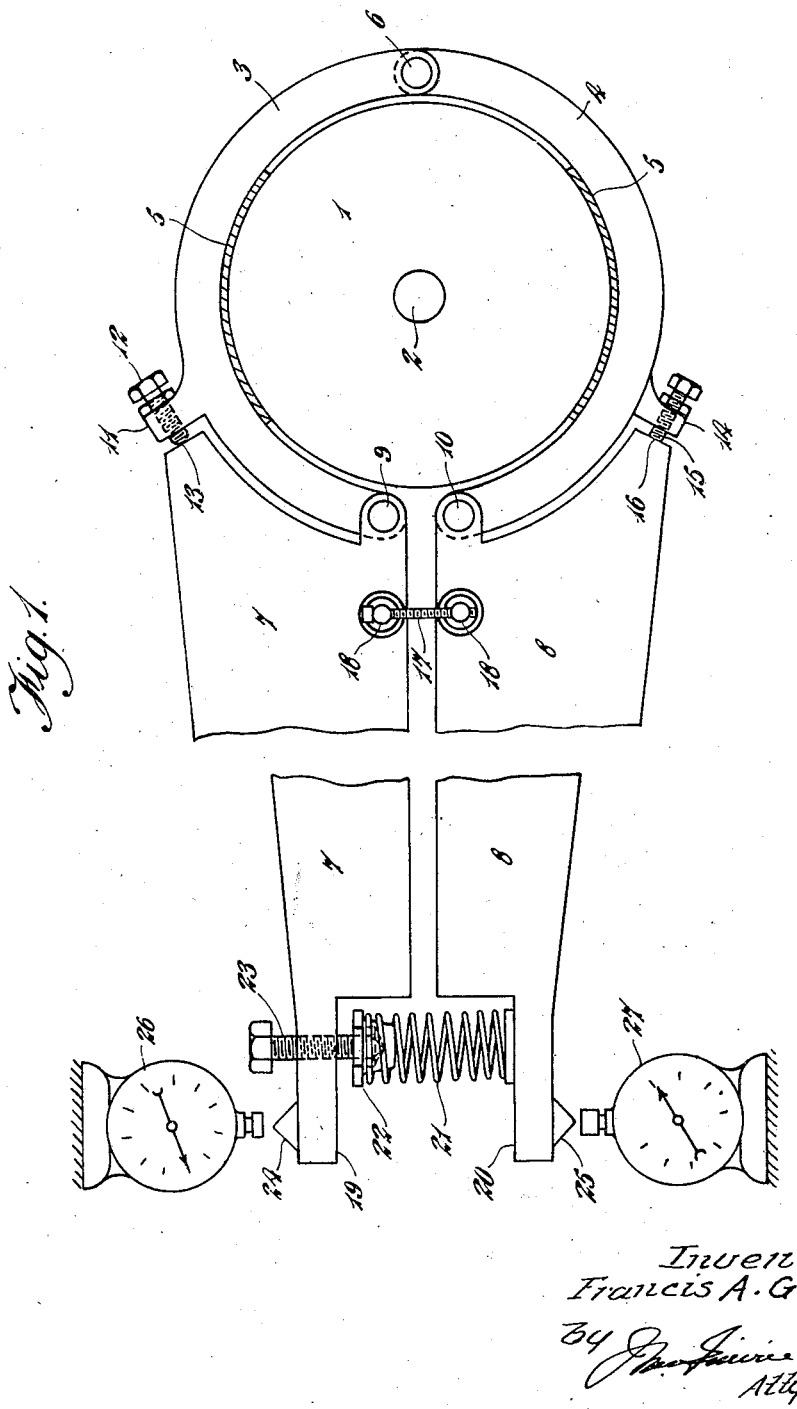
Inventor
Francis A. Garrett

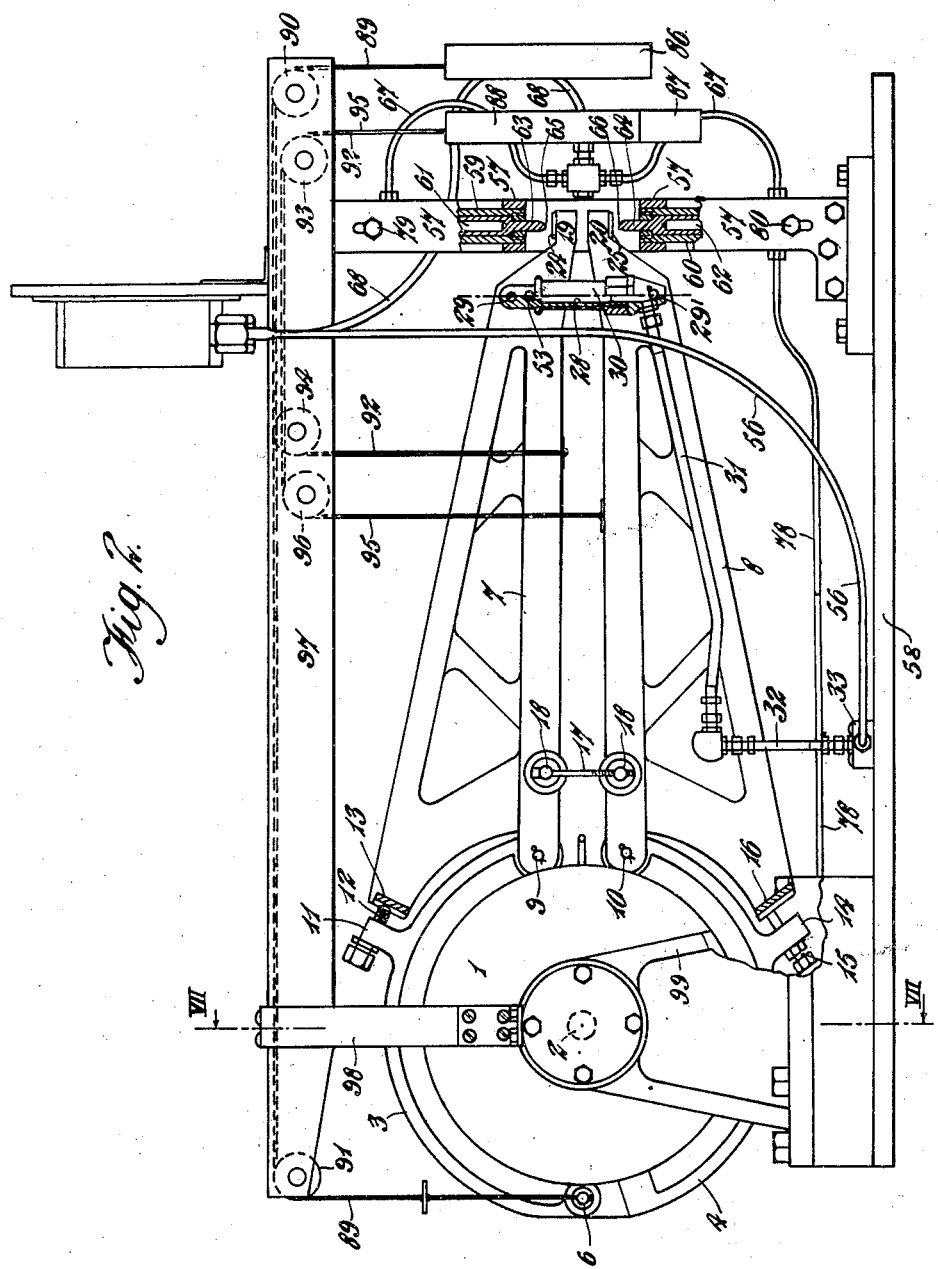

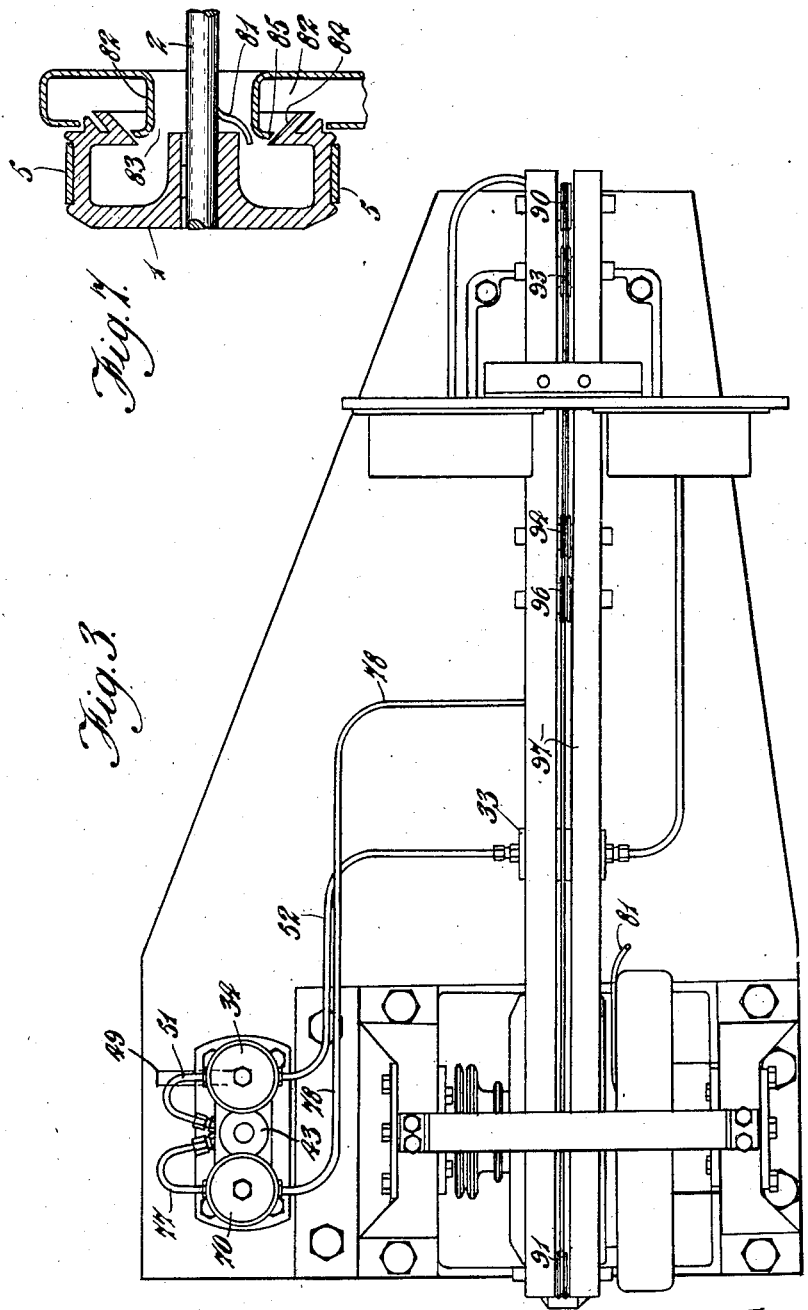

March 27, 1945. F. A. GARRETT 2,372,420
DYNAMOMETER
Filed Feb. 1, 1944 5 Sheets-Sheet 4
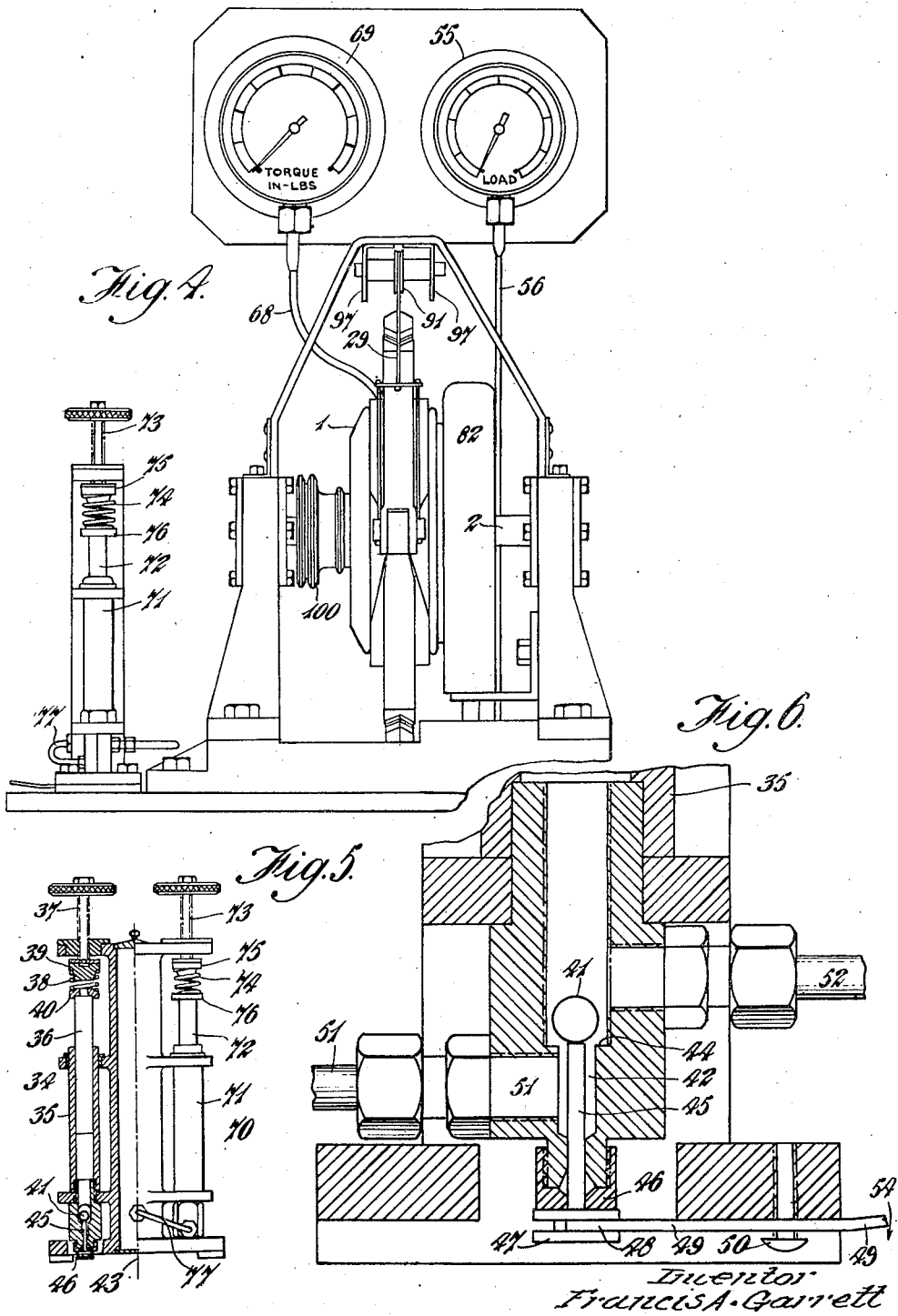
Inventor
Francis A. Garrett March 27, 1945.  F. A. GARRETT  2,372,420
DYNAMOMETER
Filed Feb. 1, 1944  5 Sheets-Sheet 5
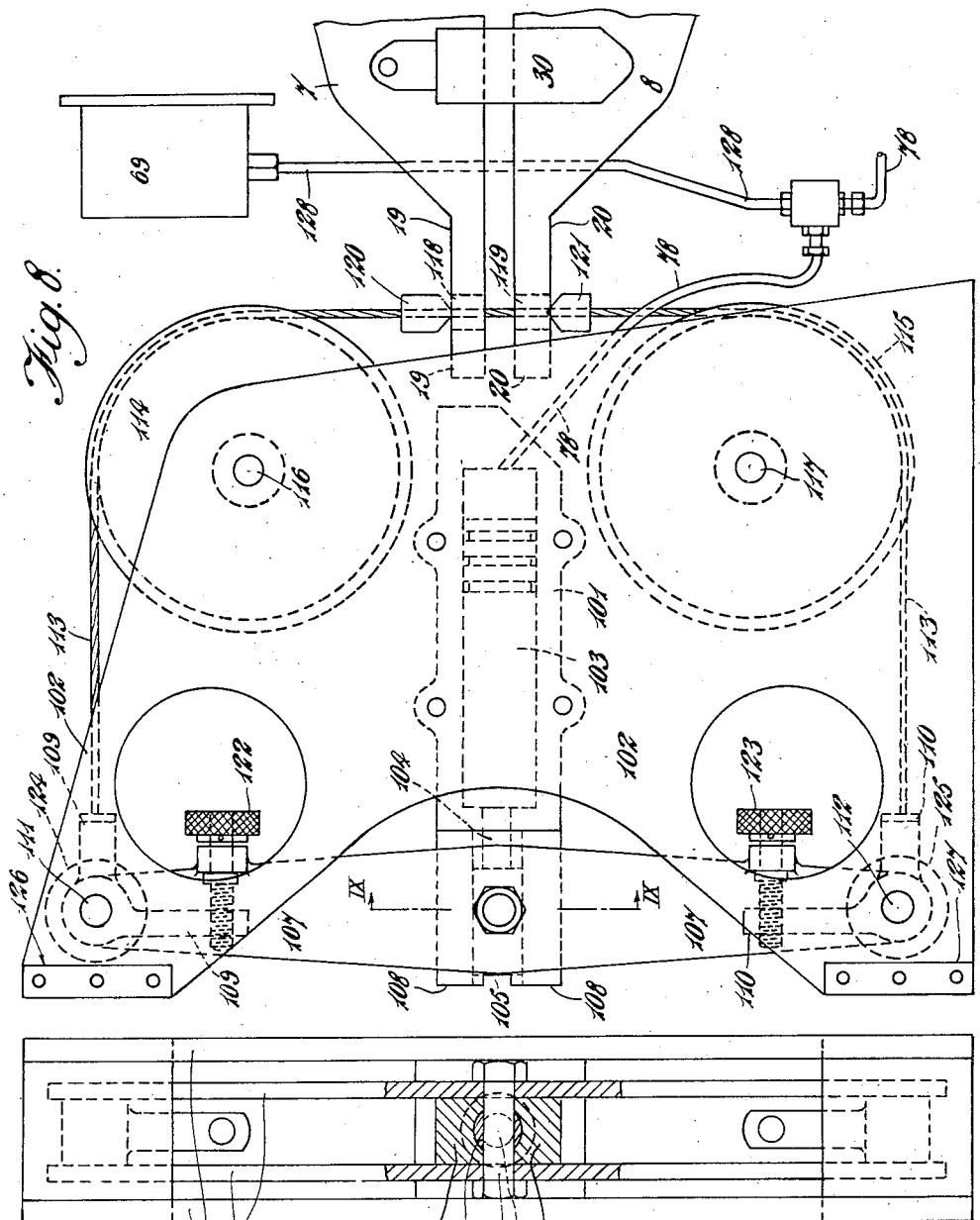

Patented Mar. 27, 1945

2,372,420

UNITED STATES PATENT OFFICE 2,372,420

DYNAMOMETER

Francis Albert Garrett, Pilton, England

Application February 1, 1944, Serial No. 520,680
In Great Britain January 14, 1943

8 Claims. (Cl. 73—134)

This invention relates to absorption dynamometers and particularly those of the so-called Prony brake type employed for testing the brake horse power of electric motors and other power units.

Hitherto these have been only suitable for a particular rotation of the unit to be tested and although of simple and varied construction, many of them give unreliable and inaccurate readings.

In order to overcome the difficulty of fluctuating readings, one form is known in which a secondary lever is fulcrumed to the brake lever, the brake lever being rigidly connected to an upper brake shoe and the secondary lever being connected by a suspension bolt to a lower brake shoe which is also connected by another suspension bolt to the adjacent end of the brake lever.

The end of the secondary lever remote from the brake has a knife edge or point for contact with a spring balance. A coiled compression spring is interposed between the fulcrum and the ends of the two levers adjacent to the balance.

In use, when the power unit is rotating, the friction set up between the brake and the wheel on which it is applied causes a load to be applied to the spring balance from which the load given off by the power unit can be ascertained.

When the frictional load becomes unsteady, thus tending momentarily to increase the reading on the spring balance, the compression of the coiled spring is varied by an amount proportionate to such momentary increase, so that the load, through the secondary lever, is increased and the secondary lever moves about its fulcrum. The readings, therefore, are steady and the effect of the compression spring between the two levers is to negative the momentary increase referred to.

The invention consists in a dynamometer, of the above type, which is reversible, that is, it is suitable for use in testing a power unit irrespective of the direction of rotation of the brake drum or wheel to which it is applied, namely, whether the drum rotates in a clockwise or anticlockwise direction while the test is being performed, at the same time assuring accurate and steady readings.

In the drawings:

Figure 1 is a somewhat diagrammatic side elevation of a simple form of dynamometer according to the invention.

Figure 2 is a side elevation of another form, some parts being broken away to show parts in section.

Figures 3 and 4 are, respectively, a plan and an end elevation corresponding to Figure 2.

Figure 5 is an elevation, half in section, of the boosters.

Figure 6 is a sectional elevation of the lower part of one booster cylinder on a larger scale.

Figure 7 is a sectional elevation of the brake drum with the shoe linings shown engaging it, the section being taken on the line VII—VII, Figure 2.

Figure 8 is a side elevation illustrating a modification of part of the form of dynamometer shown in Figures 2 to 7.

Figure 9 is an end sectional elevation on the line IX—IX, Figure 8.

In the form of dynamometer according to the invention illustrated by Figure 1, a brake drum 1 is fixed on the shaft 2 which is or can be driven by the shaft of the power unit which is to be tested.

Two semi-circular brake shoes 3 and 4, are provided with frictional linings 5 embracing the drum 1.

The brake shoes 3 and 4 are pivotally connected together by a pin 6 and are also pivotally connected respectively to brake levers 7 and 8 by pins 9 and 10.

The brake shoe 3 has a lug 11 fitted with a screw 12 forming an adjustable abutment for engagement with a heel 13 on the adjacent end of the brake lever 7, and the brake shoe 4 has a similar lug 14 and a screw 15 for engagement with a heel 16 on the adjacent end of the brake lever 8. The brake levers 7 and 8 are pivotally connected together near the brake shoes by two link rods 17 and fulcrum pins 18, there being a link rod 17 on each side of the levers, only one being seen in Figure 1.

The free ends 19 and 20 of the brake levers 7 and 8 are shaped to accommodate a compression spring 21, which is provided with a cap 22 and an adjusting screw 23. The ends 19 and 20 also have knife edges or points 24 and 25 for engagement, respectively, with spring balances 26 and 27.

At the beginning of a test, the screw 23 of the compression spring 21 is adjusted to cause the brake levers 7 and 8 to pivot about their fulcrum pins 18, 18 to apply the brake shoes 3 and 4 to the brake drum. The adjustable abutments, namely, the screws 12 and 15, are then set so that there is a space between each screw 12 and 15 and its respective heel 13 and 16.

When the shaft 2 of the power unit to be tested is rotating in a clockwise direction, considered with reference to Figure 1, the drum 1 tends to turn the brake shoes 3 and 4 in the same direction. The space between the abutment screw 15 and the heel 16 is reduced until the screw engages with the heel. At the same time, the screw 12 recedes from the heel 13. Consequently, the lower brake lever 8 becomes the brake lever proper for the time being carrying the upper brake lever 7 upwards, to operate the spring balance or gauge 26. The upper brake lever 7 is then acting in the manner of a secondary lever being free to move about its fulcrum pin 18 should the frictional load become unsteady, the spring 21 neutralizing or negativing the momentary increase, thus ensuring a steady reading on the spring balance.

When the power unit to be tested rotates the drum 1 in an anticlockwise direction, the upper abutment screw 12 engages with the heel 13, and the lower abutment screw 15 recedes from the heel 16, the upper lever 7 becoming the brake lever proper and the lower brake lever becoming the secondary lever engaging with and operating the spring balance 27.

The form of dynamometer according to the invention illustrated by Figures 2 to 7 is similar to that above described with reference to Figure 1, and corresponding parts are indicated by similar reference numerals.

The compression spring between the brake levers is replaced by a hydraulic device. This comprises two plungers 28 pivoted together and connected to the upper brake lever 7 by a pin 29, so that they are free to oscillate relatively to the lever. Two cylinders 30, for the reception of the plungers 28, are similarly pivoted together and connected to the lower brake lever 8 by a pin 29', so that they are free to oscillate relatively to that lever. A cylinder and a plunger are arranged on each side of the brake levers, only one set being shown in Figure 2.

These cylinders are conveniently termed loader cylinders.

Twin flexible pipes 31 connect the cylinders 30 through a single pipe 32 to a distribution box 33 to which fluid, for instance oil, is delivered from a pump or so-called booster 34. This comprises a cylinder 35 fitted with a plunger 36. The plunger can be forced into the cylinder by a hand operated screw 37. A spring 38 is interposed between a cap 39 on the screw 37 and a cap 40 on the upper end of the plunger 36.

A ball valve 41, at the foot of the cylinder, controls a passage 42 between the cylinder 35 and an oil reservoir 43. The valve can be held off its seat 44, when required, as hereinafter explained, by a rod 45 which slides in a gland 46 and has a grooved collar 47 embraced by the forked end 48 of an operating lever 49 pivoted on a screw 50.

A pipe 51 connects the passage 42 to the oil reservoir 43. A delivery pipe 52 connects the cylinder 35 to the distributing box 33.

Initially the plunger 36 is reciprocated to pump oil so as to fill the distributing box 33, pipes 32 and 31 and cylinders 30, air being allowed to escape from the cylinders 30 through vent holes normally closed by screws 53 in the upper parts of hollow plungers 28. Then, any desired pressure can be set up by forcing down the plunger 36 by its screw 37. If the pressure is to be reduced, the operating lever 49 is moved as indicated by the arrow 54, Figure 6 to lift the valve 41 off its seat 44 and allow oil to escape back to the reservoir 43. The pressure of the oil in the distributing box 33 and, therefore, in the cylinders 30 is indicated on a pressure gauge 55 which is connected to the distributing box by a flexible pipe 56.

By means of the booster 34, above described, the brake levers 7 and 8 can be moved about their fulcrum pins 18, 18, so as to apply the brake shoes 3 and 4 to the brake drum 1, and the load so applied is indicated on the gauge 55. In spite of this load being maintained during operation, the booster 34 is resilient, owing to the spring 38, and consequently momentary increases in load can be neutralised or cancelled out, as is the case with the spring 21 above described with reference to the example shown in Figure 1.

A bracket 57, mounted on the base 58 of the dynamometer, supports two hydraulic cylinders 59 and 60 adjacent to the free ends 19 and 20 of the brake levers 7 and 8. They are fitted with plungers 61 and 62, respectively, which have stems 63 and 64 projecting from the cylinders and having truncated conical points 65 and 66 for engagement, respectively, with the knife edges or appropriate hardened steel inserts 24 and 25 on the ends of the brake levers 7 and 8.

The stems 63 and 64 being of less diameter than the plungers 61 and 62, the resulting shoulders can engage with the adjacent ends of the cylinders, so that the outward movements of the stems are thereby limited. These devices, comprising cylinders and plungers, are conveniently termed reactor cylinders.

The cylinders 59 and 60 are connected together by flexible pipes 67 and to a pressure gauge 69 by a pipe 68. They are supplied with oil under pressure, by a pipe 78, from a booster cylinder 70. This is of similar construction to that of the booster cylinder 34. It comprises a cylinder 71 fitted with a plunger 72 which can be forced in by a screw 73 acting through a spring 74 arranged between caps 75 and 76. It has a ball valve at its foot, similar to the ball valve 41 controlling oil supplied from the reservoir 43 by a pipe 77.

Initially oil is pumped from the cylinder 71, through pipe 78 to the cylinder 60, and through pipe 67 to the cylinder 59. Any air in the cylinders 59 and 60, during this initial filling, is allowed to escape through vents afterwards closed by screws 79 and 80.

The brake drum 1 is hollow, as shown in Figure 7.

When it is rotating, cooling water is fed into it by a pipe 81 and escapes under centrifugal action into an annular receiving trough 82 surrounding a central opening 83 at one side. The water escapes between a conical discharge funnel 84 on the drum and a lip 85 on the trough.

In order to neutralise the weight of the brake shoes 3 and 4 and of the brake levers 7 and 8, they are counterbalanced by weights 86, 87 and 88. The weight 86 is attached to a cable 89 passing over pulleys 90 and 91 to the pin 6 of the brake shoes 3 and 4. The weight 87 is attached to a cable 92 passing over pulleys 93 and 94 to the brake lever 7, and the weight 88 is attached to the cable 95 passing over pulleys 93 and 96 to the brake lever 8. The pulleys are supported between angle irons 97 which are supported by the bracket 57 near one end, and by a bracket 98 near the other end. The bracket 98 is mounted on bearing standards 99, 99 for the shaft 2 which may be driven in any convenient manner by the shaft of the power unit to be tested, for example by a driving belt on the grooved pulley 100.

In use, assuming that the shaft 2 and brake drum 1 are rotating in a clockwise direction, considered with reference to Figure 2, the screw 12 bears on the heel 13 and there is a space between the screw 15 and the heel 16. The brake levers 7 and 8 have tilted about their fulcrum pins 18, 18, so that the knife edge or steel insert 25 of the lower brake lever 8 is in engagement with the point 66 of the stem 64 of the plunger 62 of the reactor cylinder 60, tending to push the plunger downwards but the travel is restricted by upward reaction of the hydraulic pressure. The knife edge or steel insert 24 of the upper brake lever 7 is disengaged from the point 65 of the plunger 61. The upper brake lever 7 acts as the brake lever proper and the lower brake lever 8 becomes the secondary lever. The increased hydraulic pressure, due to the pressure of the point 66, is indicated on the gauge 69.

When the shaft 2 and the brake drum 1 are rotated in an anticlockwise direction, considered with reference to Figure 2, the upper brake lever 7 becomes the secondary lever and the lower brake lever 8 the brake lever proper as the screw 15 engages with the heel 16 and there is clearance between the screw 12 and the heel 13. The knife edge or steel insert 24 engages with the point 65 of the stem 63 of the plunger 61 of the reaction cylinder 59 which then becomes operative, the resulting hydraulic pressure being indicated on the gauge 69.

In a modification of the form of dynamometer just above described, the two reactor cylinders are replaced by a single reactor cylinder adapted to operate, by mechanical means, on the free ends of the brake levers. This modification is shown in Figures 8 and 9.

Only parts of the brake levers 7 and 8 are shown, it being assumed that the remainder are constructed and provided with loader cylinders 30 and brake mechanism as in the example shown in Figures 2 to 7.

A single reactor cylinder 101 is arranged horizontally in alignment with ends 19 and 20 and fixed between two rigidly mounted plates forming a frame 102. A flexible pipe 78 supplies oil under pressure to the cylinder 101 from a booster cylinder or pump, such as hereinbefore described with reference to Figure 5. A pipe 128 is connected to a pressure gauge 69.

The reactor plunger 103 has a stem or shank 104 of reduced diameter, the shoulder at the junction of the stem and plunger engaging with the adjacent end of the cylinder to form a stop. The outer end portion 105 of the stem 104 is enlarged to carry a fulcrum pin 106 for a two-armed lever 107. The enlarged portion 105 can slide between guides 108 on the end of the cylinder 101.

Bell-crank levers 109 and 110 are mounted respectively on fulcrum pins 111 and 112 carried by the lever 107. A cable 113 connected to the two levers 109 and 110 passes over pulleys 114, 115, mounted to rotate on pins 116, 117 carried by the frame 102. The cable 113 passes through holes 118, 119 in the ends 19 and 20 of the brake levers 7 and 8, and conical stops 120 and 121 are fixed on the cable adjacent to the holes. Their positions, relatively to the holes, are adjusted by adjusting trimmer screws 122 and 123 mounted in lugs on the lever 107.

The lever 107 has anti-friction rollers 124, 125 engaging with vertical flat surface blocks 126 and 127 on the frame 102.

In operation, when the brake lever 7 rises and engages with the stop 120, it tends to move the cable 113 and thereby the lever 107, the roller 124 bearing hard against the block 126, and the roller 125 moving away from the block 127. The lever 107 presses on the reactor plunger 103 and tends to move it into the cylinder 101 against the hydraulic pressure until a balance is effected, the pressure being indicated on the gauge 69.

When the brake lever 8 moves downwards into engagement with the stop 121, the lever 107 is again moved by the cable, the roller 124 moving away from the block 126, and the roller 125 bearing hard on the block 127, the lever 107 again pressing on the reactor plunger 103 so that the pressure is again indicated on the gauge 69.

I claim:

1. A reversible dynamometer comprising a brake drum, two brake shoes for application to the brake drum, said shoes being pivotally connected together on one side of the centre of rotation of the drum, a brake lever pivotally connected to each of said shoes on the other side of said centre, an adjustable abutment on each shoe at a position between its two pivotal connections, for engagement with its respective brake lever, fulcrum pins and links connecting the brake levers together and providing fulcra for said levers near the brake shoes, adjustable and resilient means between the brake levers near the free ends thereof for applying load to the levers for loading the brake shoes, torque indicating means, and means for engagement, alternatively, with the free ends of the brake levers for operating said torque indicating means accordingly as the brake drum rotates in one direction or another.

2. A reversible dynamometer comprising a brake drum, two brake shoes for application to the brake drum, said shoes being pivotally connected together, a brake lever pivotally connected to each brake shoe, an adjustable abutment on each brake shoe for engagement with its respective brake lever, fulcrum pins and links connecting said brake levers together and providing fulcra for said levers near the brake shoes, adjustable and resilient means for applying load to the brake levers near their free ends for applying the brake shoes to the brake drum, hydraulic reacting cylinders having plungers for alternative engagement with the free ends of the brake levers accordingly as the brake drum rotates in one direction or another, means for supplying liquid under pressure to said reacting cylinders, and a pressure gauge connected with said reacting cylinders for indicating the reacting force or torque load applied to the free end of the brake lever which is in engagement with a plunger.

3. A reversible dynamometer comprising a brake drum, two brake shoes for application to the brake drum, said shoes being pivotally connected together, a brake lever pivotally connected to each brake shoe, an adjustable abutment on each brake shoe for engagement with its respective brake lever, fulcrum pins and links connecting said brake levers together and providing fulcra for said levers near the brake shoes, loader hydraulic cylinders pivotally mounted on one brake lever near its free end, plungers for said cylinders pivotally mounted on the other brake lever, means for supplying liquid under pressure to said loader cylinders to apply load to the brake levers for applying the brake shoes to the drum, and a pressure gauge for indicating the load applied by said loader cylinders, stationary hydraulic reactor cylinders having plungers for alternative engagement with the free ends of the brake levers accordingly as the brake drum rotates in one direction or another, means for supplying liquid under pressure to said reactor cylinders, and a pressure gauge connected with said reactor cylinders for indicating the reacting force or torque load applied to the free end of the brake lever which is in engagement with a plunger.

4. A reversible dynamometer as specified in claim 3 said means for supplying liquid under pressure to the reactor and loader cylinders, comprising in each case a pump cylinder and plunger, a screw for forcing the plunger into the cylinder to set up hydraulic pressure, and a spring interposed between the screw and the plunger to provide a resilient connection therebetween so that the reactor cylinders can react to neutralise momentary increases in load.

5. A reversible dynamometer as specified in claim 3 said means for supplying liquid under pressure to the loader cylinders, comprising a pump cylinder and a plunger, a screw for forcing the plunger into the cylinder to set up hydraulic pressure, a spring interposed between the screw and the plunger, a reservoir for liquid, an automatic valve at the foot of the cylinder for controlling the flow of liquid from the reservoir to the cylinder, and manually operable means for raising said valve from its seat when it is required to relieve the pressure of liquid in the cylinder.

6. A reversible dynamometer comprising a hollow brake drum, a shaft therefor having means for effecting a driving connection between it and a power unit to be tested, a central opening in one side of said drum, a pipe for delivering cooling water into said drum, a gutter surrounding said central opening to receive water discharged from said drum, two brake shoes embracing said drum, the shoes being pivotally connected together on one side of said shaft, a brake lever pivotally connected to each brake shoe on the opposite side of said shaft, an adjustable abutment on each brake shoe at a position between its two pivotal connections for engagement with its respective brake lever, fulcrum pins and links connecting the brake levers together and providing fulcra for said levers near the brake shoes, hydraulic loader cylinders pivotally mounted on one brake lever near its free end, plungers for said cylinders pivotally mounted on the other brake lever, means for supplying liquid under pressure to said loader cylinders to apply load to the brake levers for applying the brake shoes to the brake drum, a pressure gauge for indicating said load, stationary hydraulic reactor cylinders having plungers for alternative engagement with the free ends of the brake levers accordingly as the brake drum rotates in one direction or another, means for supplying liquid under pressure to said reactor cylinders, and a pressure gauge connected with said reactor cylinders for indicating the reacting force or torque load applied to the free end of the brake lever which is in engagement with a plunger.

7. A reversible dynamometer comprising a brake drum, a shaft therefor, two brake shoes embracing said drum, said brake shoes being pivotally connected together, a brake lever pivotally connected to each brake shoe, an adjustable abutment on each shoe at a position between its two pivotal connections for engagement with its respective brake lever, fulcrum pins and links connecting the brake levers together and providing fulcra for said levers near the brake shoes, loader cylinders pivotally mounted on one of said brake levers near its free end, plungers for said cylinders pivotally mounted on the other brake lever, means for supplying liquid under pressure to said loader cylinders to apply load to the brake levers for applying the brake shoes to the brake drum, a pressure gauge for indicating said load, a single stationary reactor cylinder arranged horizontally in alignment with the brake levers near the free ends thereof, a plunger for said reactor cylinder, a vertical two-armed lever pivotally mounted on the outer end of said plunger, a cable attached at its two ends to opposite ends of said lever, guide pulleys for guiding said cable vertically through holes in the free ends of the brake levers, stops on said cable for alternatively engaging with said free ends adjacent to said holes according to the direction of rotation of the brake drum, means for supplying liquid under pressure to said reactor cylinder and a pressure gauge connected therewith for indicating the reacting force or torque load on the end of the brake lever in engagement with a stop on the cable.

8. A reversible dynamometer as specified in claim 7 having adjustable connections between the ends of the cable and the ends of the two-armed lever.

FRANCIS ALBERT GARRETT.